United States Patent [19]
Baylor

[11] 3,948,574
[45] Apr. 6, 1976

[54] JOINT WITH A COMBINED SEAL AND BUSHING

[75] Inventor: John M. Baylor, Bettendorf, Iowa

[73] Assignee: J. I. Case Company, Racine, Wis.

[22] Filed: June 19, 1975

[21] Appl. No.: 588,408

[52] U.S. Cl. ............. 305/58 PC; 74/251 R; 305/59; 305/41; 277/92
[51] Int. Cl.² ......................................... B62D 55/08
[58] Field of Search ............ 277/92, 94, 95; 305/14, 305/39, 41, 42, 43, 50, 56, 58, 59, 60; 74/245 R, 245 S, 248, 249, 250 R, 250 S, 251 R, 252, 256, 7, 8; 308/36.1, 237 R–240

[56] References Cited
UNITED STATES PATENTS

| | | | |
|---|---|---|---|
| 3,125,347 | 3/1964 | De Moude | 277/92 |
| 3,380,791 | 4/1968 | Peck | 277/95 |
| 3,563,613 | 2/1971 | Schulz | 305/42 |
| 3,595,572 | 7/1971 | Granda | 277/92 |

*Primary Examiner*—Allen N. Knowles
*Assistant Examiner*—D. W. Keen
*Attorney, Agent, or Firm*—Arthur J. Hansmann

[57] ABSTRACT

A joint with a combined seal and bushing and including a cylindrical member and a bushing on the cylindrical member and two links piloted on the cylindrical member, and all forming a joint. The members present a circular counterbore and the bushing has its end facing the counterbore and there is an elastomeric combined seal and bushing member in the counterbore and being compressed between the members to avoid wear therebetween and dampen noise.

7 Claims, 5 Drawing Figures

U.S. Patent  April 6, 1976  3,948,574
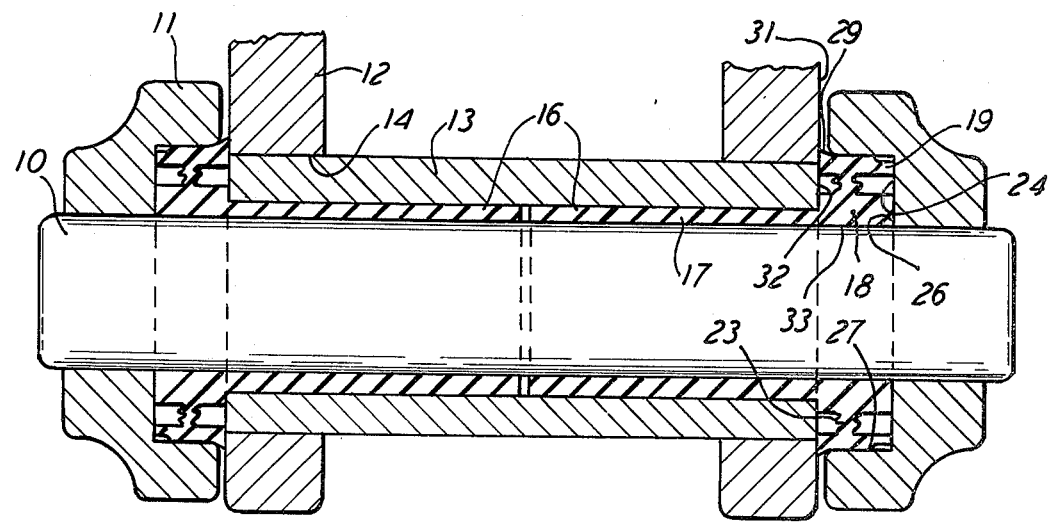
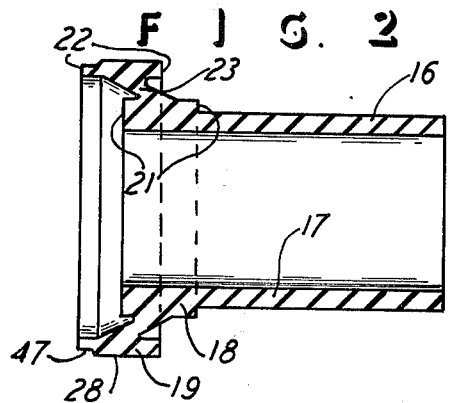
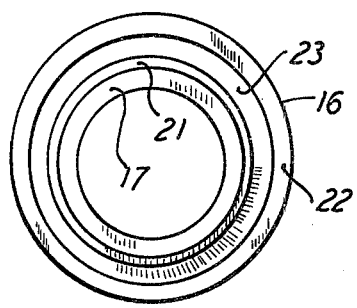
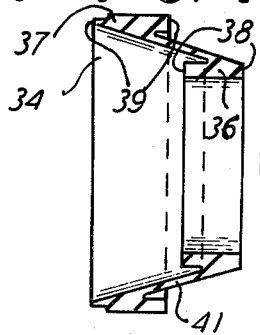
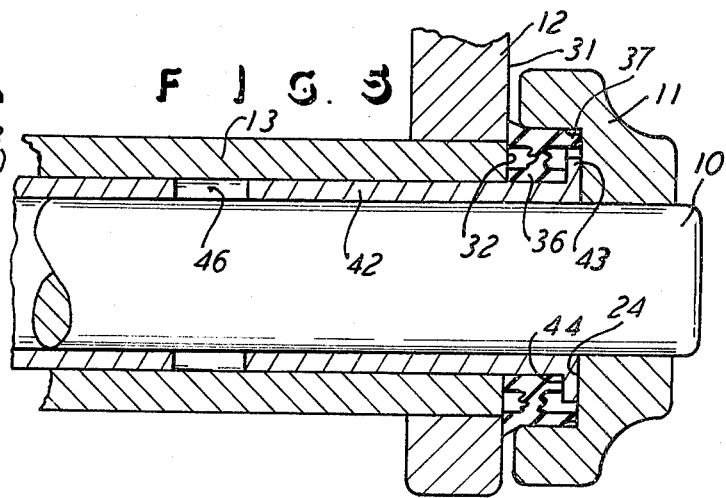

JOINT WITH A COMBINED SEAL AND BUSHING

This invention relates to a joint with a combined seal and bushing, and, more particularly, it relates to a joint which is found in the arrangement of links which form a track for a crawler tractor.

BACKGROUND OF THE INVENTION

The prior art is already aware of the formation of tracks in crawler tractors, and it is also aware of various arrangements for constructing joints which secure the links of track elements together in an endless manner. Still further, the prior art discloses many different arrangements of seals and also bushings which are utilized in articular joints, including the joints of a track in a crawler tractor. Examples of some of the prior art arrangements are found in U.S. Pat. Nos. 3,341,259 and 3,347,602 and 3,595,572 and 3,622,165 and 3,680,924. These prior art patents show arrangements of links and joints and seals, all of which are shown in the environment of an endless track for a crawler tractor.

The present invention provides an improvement over these prior art arrangements, and, more particularly, it provides a combined track seal and bushing which keeps the joint clean and which retains the lubrication in the joint and which also lessens and dampens noise otherwise created by the movement of the links forming the joint. Still further, the present invention provides a joint which minimizes wear on the parts of the joint which would otherwise be in contact with each other and which would be arranged to permit entrance of some amount of dirt into the joint and which would also permit the escape of some lubrication, all toward the undesirable end of causing undue wear and consequent looseness and failure of the joint.

Still further, it is an object of this invention to provide a joint which has the aforementioned advantages and which accomplishes those advantages without any unduly complicated parts and with only a reasonable amount of expense and while providing a reliable and sturdy joint which will last for a long time. Still further, the joint of this invention is arranged so that it can be readily and easily assembled by utilizing conventional manners and equipment for assembling crawler tractor tracks, and therefore no special skills nor tools are required.

More specifically, the present invention provides a joint with a combined seal and bushing which does not permit the entrance of dirt or the like and which therefore does not have dirt rubbing on the parts which are in moving contact, and, consequently, the joint of this invention is more reliable and has a longer life compared to the joints of the prior art. Also, the parts forming the joint of this invention can be made and assembled with less clearance than the corresponding parts of the prior art, and, accordingly, the combined seal and bushing of this invention is subjected to less eccentric positioning and therefore less failure due to unloading of the seal surface itself and thus there is no tendency for the seal surface to become damaged and fail.

Still further, in accomplishing the aforementioned objectives and advantages, the present invention provides a joint with a combined seal and bushing which can be reliably arranged to be compressed between the parts forming the joint, and thus the combined seal and bushing member serves its functions of keeping the joint free from dirt and also tightening the joint and avoiding undue generation of noise and wear in the joint.

Other objects and advantages will become apparent upon reading the following description in light of the accompanying drawings.

BRIEF DESCRIPTION OF THE DRAWINGS

FIG. 1 is a sectional view taken longitudinally through a joint made according to this invention.

FIG. 2 is a sectional view through the combined seal and bushing shown in FIG. 1.

FIG. 3 is an end elevational view of the seal and bushing shown in FIG. 2.

FIG. 4 is a longitudinal sectional view through a combined seal and bushing of another embodiment of this invention.

FIG. 5 is a sectional view taken longitudinally through another embodiment of a joint of this invention.

DETAILED DESCRIPTION OF THE PREFERRED EMBODIMENTS

The two embodiments shown in FIGS. 1 and 5 are of a track which is useful in a crawler tractor, and a more complete showing of the track itself may be found in the prior art patents mentioned at the outset of this document. In the general arrangement of a joint for a crawler tractor track, there is therefore commonly provided a pin 10 on which is piloted the usual track links 11 and 12, with one of each link located at each end of the pin 10, as shown in FIG. 1. Also, a metal bushing 13 is in a cylindrical shape and is actually interposed between the links 12 and the pin 10 by passing into the usual circular openings 14 in the links 12. In the usual manner and as is well known to one skilled in the art, the pin 10 and the links 11 and 12 and the main bushing 13 can all be pressed together by pressure directed axially of the pin 10 to form the assembly shown in FIGS. 1 and 5.

The present invention provides the joint with the arrangement of the aforementioned parts as shown in FIGS. 1 and 5 and with the utilization of an elastomeric member 16 which is compressed into the position shown in FIG. 1, for instance, and which is of course of a material which is resilient and may be made of a rubber so that it can be snug and compressed into the position shown in FIG. 1, compared to its free-body position shown in FIGS. 2 and 3. Thus, the member 16 has a cylindrical portion 17 and it has two cylindrically-shaped portions 18 and 19 which are concentrically disposed and which are nested together, at least in the assembled position shown in FIG. 1. Both portions 18 and 19 have flat annular surfaces 21 and 22, respectively, on opposite ends thereof, and these surfaces extend along planes transverse to the cylindrical axis of the member 16 and are therefore at right angles to that axis, as shown. Also, the member 16 has a web or wall 23 extending between the portions 18 and 19, and thus the member 16 in its portions 18 and 19 and 23 are disposed in the form of a slanted I as seen in the free-body view in FIG. 2, and such observation and description further defines and specifies the construction and configuration of the member 16.

In the assembled position of FIG. 1, the portions 18 and 19 and the intervening web 23 are all compressed, and thus the member 16 forms a combined seal and bushing between the joint parts in contact with the member 16. Further, FIG. 1 shows that there are two such members 16, at opposite ends of the pin 10.

The link 11 has a counterbore 24 defined by a bottom wall 26 and a circular wall 27, and the member 16 has its circular surface 28 extending along the length of the counterbore wall 27 and actually having the outer tip designated 29 of the portion 19 pressed outwardly and against the surface 31 of the link 12. Also, the main bushing 13 has its annular end surface 32 in contact with the surfaces 21 and 22 of the member 16. That is, the joint with its three members 11 and 12 and 13 provide the surfaces 24 and 31 and 32, facing each other, and these surfaces are pressed against the surfaces 21 and 22 of the member 16, to thus form a tight seal and bushing arrangement with the member 16. Further, the web portion 23 is distorted and compressed in the assembled position, as shown in FIG. 1, and thus the web portion 23 further tends to force the circular portions 18 and 19 away from each other and thus into tight contact with the counterbore wall 27 and with the circumference of the pin 10 at the inner circumference designated 33, respectively. Thus, in the compressed and assembled position of FIG. 1, the cross-section of the member 16 through the portions 18 and 19 presents an upright letter I configuration, compared to the slanted letter I configuration shown in FIG. 2. Also, the portion 18 is thus in snug and sealing relation with the pin 10, and the portion 19 is in snug and sealing relation with the counterbore wall 27. Further, the unassembled inner diameter of the portion 18 is less than the diameter of the pin 10 so that the portion 18 may actually be stretched onto the pin 10 in the assembled position to insure snug and sealing relationship therebetween. Still further, the axial lengths of the portions 18 and 19 are slightly greater than the spacings between the counterbore base 24 and the bushing end surface 32, so the portions 18 and 19 are compressed axially in the assembled position. In achieving the assembly, the members 16 can be positioned on the pin 10 and the links 11 can then be pressed onto the pin 10 and extend over the portions 19 to the assembled position shown in FIG. 1. By containing the member 16 between the surface 32 and the counterbore base 24, compression of the elastomeric member 16 will result in a higher load value and guarantee no rotation between the member circumference 28 and the link 11. Also, there will be some torsional action by virtue of the web 13 in the pivot action of the joint itself, and thus the combined seal and bushing is of a torsional nature created by the tendency for the portions 18 and 19 to rotate relative to each other in response to the articular action of the joint shown.

FIG. 4 shows a different combined seal and bushing designated 34 and having an inner annular portion 36 and an outer annular portion 37 with the portions having respective end surfaces 38 and 39. Also, an intervening web or wall portion 41 extends integrally between the portions 36 and 37 to again form a slanted letter I or, in this instance, a letter Z-shape in the free-body form in FIG. 4. Then, the assembled form for the member 34, as shown in FIG. 5, the member assumes a compressed form of the letter I. Also, FIG. 5 shows there is a metal bushing 42 interposed between the pin 10 and the main bushing 13, and the bushing 42 has a flanged end 43 which presents a surface 44 in abutment with the surface 38. Further, in FIG. 5, the member 34 shows its surfaces 39 in respective abutment with the counterbore base 24 and the surface 31 of the link 12 and the end surface 32 of the main bushing 13, and the surface 38 of the elastomeric member 34 is also pressed against the bushing surface 32. Thus, the elastomeric member 34 is stretched and snug on the flanged bushing 42, and it is compressed in the position shown in FIG. 5, both axially of the member 34 as well as radially thereof, and the outer diameter of the flange 42 adjacent the member 34, as seen in the gap between FIGS. 4 and 5, shows that the member 34 is assembled on the bushing 42 by being stretched thereover, all for the snug fit described herein. Also, the bushings 42 present a space 46 therebetween, and this space is appropriate for an oil reservoir.

To facilitate assembly of the elements as shown in FIGS. 1 and 5, the members 16 and 34 are provided with an undercut chamfer designated 47 in FIG. 2. The chamfer 47 permits entry of the bushing members into the counterbore 24 when the parts are pressed together in the direction axially of the pin 10. The respective webs 23 and 41 will concentrically position the portions 19 and 37 relative to the counterbore 34 in the assembly procedure mentioned. Also, there is an interference fit between the outer circumference of the portions 19 and 37 and the counterbore circumference 27 and thus the portions 19 and 18 are held against rotation relative to the surfaces which they are abutting, as shown in FIGS. 1 and 5, respectively.

With the arrangements shown and described herein, there is provided a combined seal and bushing which provides a clean and quiet joint and which provides a self-accommodating or aligning type of seal and therefore is one of longer life and one which requires less manufacturing care and tolerances.

What is claimed is:

1. A joint with a combined seal and bushing, comprising a cylindrical member, a bushing on said cylindrical member and terminating in an end surface, two pivotal members piloted on said cylindrical member and said bushing and extending radially outwardly therefrom and being pivotal relative to each other and spaced apart, one of said pivotal members having a circular counterbore facing said bushing end surface and with said counterbore having a base surface parallel to and spaced from said bushing end surface, and an elastomeric combined seal and bushing member disposed in said counterbore and having two cylindrically-shaped portions of different diameters and concentrically disposed and nested together with one thereof telescoped inside the other, and with both said portions having a flat annular surface on each axial end thereof and extending along respective planes transverse to the cylindrical axis of said portions and with the two said annular surfaces of each said portion being in respective abutment with said bushing end surface and said counterbore base surface, said elastomeric member being compressed between said two pivotal members and being of an axial length to present a bushing therebetween and thereby maintain the space between said two pivotal members and thus avoid wear and noise creation therebetween, and said elastomeric member having an elastomeric web integral with its said two cylindrically-shaped portions and being compressed therebetween to urge said portions radially away from each other and into snug contact with the other three said members for forming seals thereat.

2. The joint as claimed in claim 1, wherein said elastomeric member is shaped and disposed to present a slanted I-shaped cross-section prior to assembly with the other said members, and is adapted to present a compressed I-shaped cross-section when assembled with the other said members.

3. The joint as claimed in claim 1, wherein the inner circumferential surface of the smaller one of said two portions extends throughout its length in snug contact with said cylindrical member, and the outer circumferential surface of the larger one of said two portions extends in snug contact with the circumferential wall defining said counterbore and for the entire depth of said wall.

4. The joint as claimed in claim 1, wherein the diameter of the inner circumferential surface of the smaller one of said portions is less than the outer diameter of said cylindrical member, for stretched fit of said inner circumferential surface on said cylindrical member.

5. The joint as claimed in claim 1, wherein said elastomeric member includes a cylindrical portion integral with the smaller of the other two said portions and extending therefrom in snug contact with said cylindrical member to present a bushing along said cylindrical member.

6. The joint as claimed in claim 1, including a cylindrical bushing having an outwardly flanged end and being interposed between said elastomeric member and said cylindrical member.

7. The joint as claimed in claim 1, wherein the axial lengths of said portions are at least as long as the respective spacing between said counterbore base surface and said bushing end surface for snug fit of said portions between the latter said surfaces.

\* \* \* \* \*